United States Patent

Petersen et al.

[11] 3,880,528
[45] Apr. 29, 1975

[54] LIGHT PROBE

[75] Inventors: Lawrence Christof Petersen, Aloha; Bruce Michael Jerrick, Portland, both of Oreg.

[73] Assignee: Tektronix, Inc., Beaverton, Oreg.

[22] Filed: July 2, 1973

[21] Appl. No.: 375,427

[52] U.S. Cl. .............................. 356/225; 250/239
[51] Int. Cl. .................................. G01j 1/42
[58] Field of Search .......................... 250/239; 356/218–228

[56] References Cited
UNITED STATES PATENTS

| | | | |
|---|---|---|---|
| 1,764,368 | 6/1930 | Thomas | 250/239 |
| 2,337,122 | 12/1943 | Norwood | 356/225 X |
| 2,813,982 | 11/1957 | Billett | 356/186 |
| 2,959,092 | 11/1960 | Faulhaber | 356/219 X |

*Primary Examiner*—Ronald L. Wibert
*Assistant Examiner*—F. L. Evans
*Attorney, Agent, or Firm*—Adrian J. LaRue

[57] ABSTRACT

A light probe for use with a photometer includes a silicon photo-voltaic sensor mounted behind a specially designed lens which accurately corrects the sensor to a cosine distribution curve. A light-blocking eyebrow is disposed around the lens to control the light relative to the lens surface. The measured light distribution as detected by the sensor is a function of the curvature, diffusion factor, and surface roughness of the lens, and the relationship of the eyebrow to the lens.

5 Claims, 4 Drawing Figures

LIGHT PROBE

BACKGROUND OF THE INVENTION

The advantages of the silicon photo-voltaic cell or photo-diode for use as a light-sensing device for photometry are well known in the art. However, the angular response of a light sensor including a silicon photo-diode limits the field of light detection to a conical configuration. This limitation leads to erroneous measurements, particularly in measuring ambient light conditions where a full 180° field is present. When the angular response for an uncorrected silicon sensor is plotted on a polar graph, the cosine distribution appears in an inverted teardrop shape instead of the circular shape that is desired.

Previous attempts to provide cosine correction have included a flat lens member having bevelled edges. Some correction is elicited thereby; however, such previous devices still exhibit an error of 30% or more in measurements over the complete ambient light field.

SUMMARY OF THE INVENTION

The device according to the present invention includes a curved lens portion having a constant radius of curvature, and a silicon photo-voltaic sensor which is disposed behind such lens. The lens has a frosted outside surface which captures photons as they strike. The photons are then diffused in the lens and re-radiated through an appropriate spectral filter to the photo-diode. An annular eyebrow structure is disposed around the outside of the lens portion to control the amount of shading and blocking of light upon the lens. The eyebrow can be adjusted relative to the lens to control the amount of lens surface exposed to the extreme angles. The effect is a correction of the half-angle response curve of the silicon photo-voltaic sensor and a correction to within 2% of the cosine distribution curve.

It is therefore one object of the present invention to increase the field of view for a light sensor comprising silicon photo-voltaic cell and a spectral filter.

It is another object of the present invention to accurately correct a light sensor to a cosine distribution curve.

It is yet another object of the present invention to provide a light probe which can be adjusted to maximize cosine distribution.

It is a further object of the present invention to provide a light probe having increased sensitivity to light at extreme angles.

Further objects, features, and advantages will be apparent from consideration of the following description taken in conjunction with the accompanying drawings.

DRAWINGS

FIG. 1 shows an isometric view of a light probe according to the present invention, FIG. 2 shows a cross-sectional view of the probe taken along the line X —X' of FIG. 1, FIG. 3 is a graph of half-angle response curves showing point-by-point deviation for uncorrected and corrected silicon photo-voltaic sensors, and FIG. 4 is a polar graph showing cosine distribution curves for uncorrected and corrected silicon photo-voltaic sensors.

DETAILED DESCRIPTION

Figure 1:
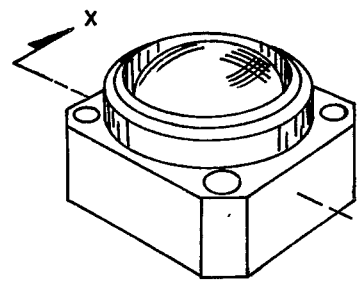
Figure 2:
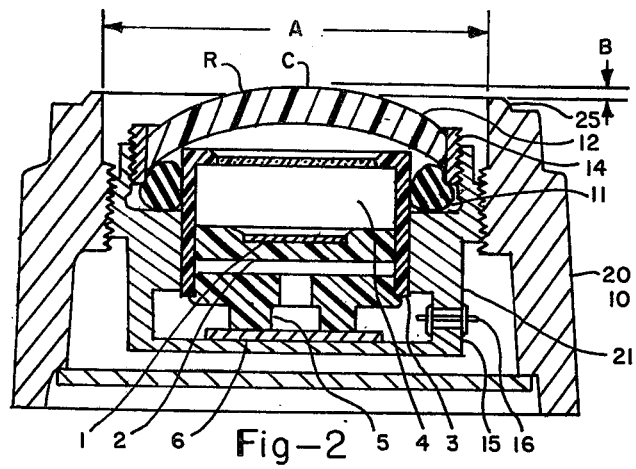
Figure 3:
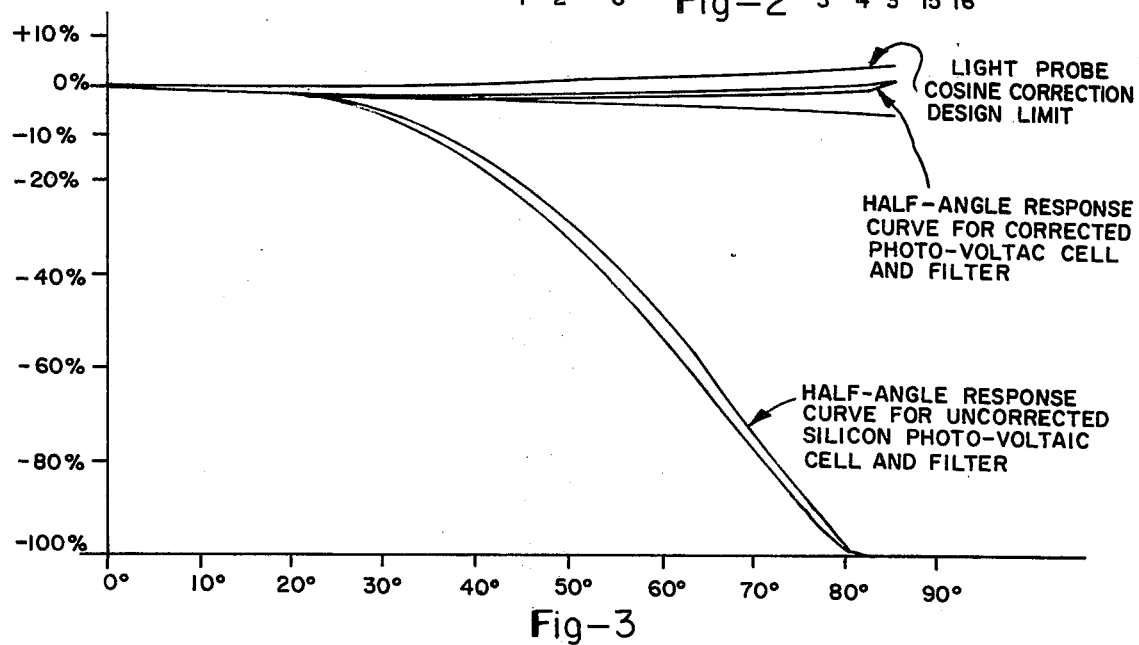

FIG. 1 shows an isometric view of a light probe according to the present invention. FIG. 2 shows a cross-sectional view of the probe taken along the line X —X' of FIG. 1. A photo-voltaic cell 1 is mounted on a support member 2 and placed in a sensor housing member 3 along with an appropriate spectral filter 4. A sensor housing bottom plate member 5 having a small hole therethrough for the passage of electrical wires and a pair of spacer means as an integral part of the plate member 5 is affixed to the bottom of the sensor housing member 3 to form an environmentally-sealed sub-assembly unit containing the photo-voltaic sensor 1, 4. Sensor housing member 3 has an opening in the top to allow passage therethrough of light, such light subsequently passing through the filter 4 to the photo-voltaic cell 1. The photo-voltaic cell 1 is preferably a silicon photo-diode, and FIG. 3 shows the half-angle light response curve for such a photo-diode and its associated filter. As shown, the response falls off to −100% for an angle of 80° from the optical axis, which is normal, or perpendicular to the sensor. This response, when plotted on a polar graph in terms of cosine-distribution, appears as the inner curve shown in FIG. 4.

A pad 6 of resilient material is placed on the inside bottom surface of a cup-like probe body member 10, and the sensor housing sub-assembly including the photo-voltaic sensor 1, 4 is placed inside the probe body member 10 upon the pad 6. An O-ring 11 of resilient material is placed in a groove formed by the outside of the sensor housing member 3 and a threaded lip portion of probe body member 10. A dome-shaped lens member 12 is placed over the sensor housing 3 and in contact with the O-ring 11. A threaded bezel 14 having an annular shape is placed around the periphery of the lens member 12 and screwed into the threaded lip portion of probe body member 10, securing the lens member 12 to the probe body member 10 and compressing the pad 6 and O-ring 11 to hermetically seal the internal components previously described. An insulator member 15 having a wire 16 therethrough allows electrical connections to be made to the photo-voltaic cell 1 inside the probe body member 10.

The probe body 10 is then screwed into an outer probe housing member 20 and is suspended therein. A bottom cover plate 21 is attached to the bottom of the housing member 20 to complete the mechanical structure which forms the light probe. The outer probe housing member 20 has a raised lip portion, hereinafter called eyebrow, 25 around the upper rim thereof to control the amount of light striking the lens member 12, as will be described in detail in a subsequent paragraph.

Lens member 12 is constructed of a diffusing material, such as plastic or the like having a spectrally opaque optical density. This diffusion reduces the intensity by a factor of 2 and aids in reshaping the cosine distribution curve. A frosted outer surface traps photons as they impinge on the lens 12; then the photons are diffused in the lens and re-radiated into the filter 4 to the photo-voltaic cell 1. Lens member 12 is shaped like a portion of a sphere and has a constant radius of curvature R; that is, it is a converging lens having a double-convex configuration. This shape serves to reduce the equivalent angle of incidence at angles greater than 45° from the optical axis, decreasing the reflection of photons.

Figure 4:
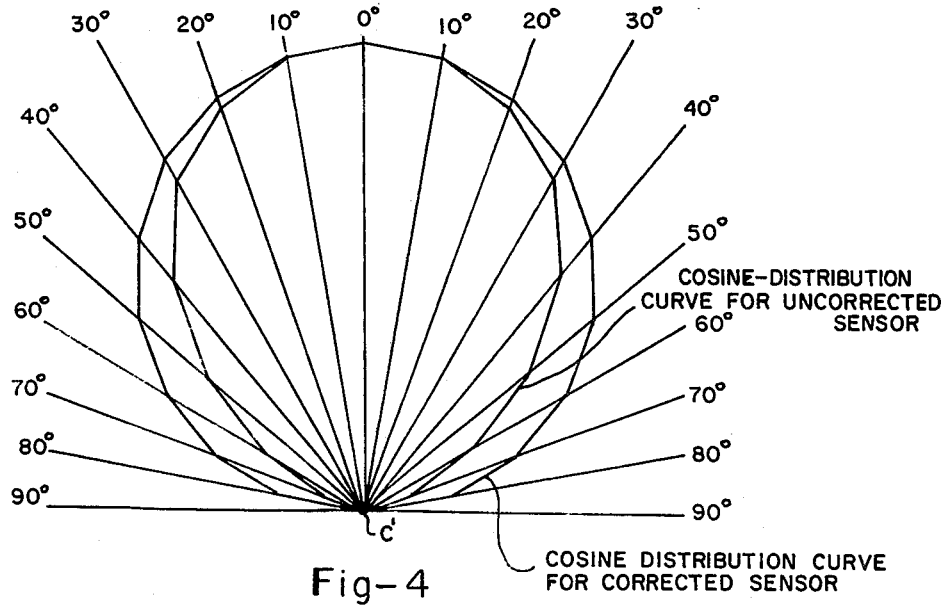

The lens member 12 and eyebrow 25 combine to increase the light from extreme angles and thereby change the half-angle response curve as shown in FIG. 3, and consequently correct the cosine distribution curve as shown in FIG. 4. The diameter A of eyebrow 25 is related to the curvature R of lens member 12 so that the eyebrow 25 shades the lens member 12 to an increasing amount for angles which are approximately 60° to 85° from normal and shuts off the light striking the lens member 12 at approximately 90° or slightly greater. The height of the lens member 12 relative to the eyebrow 25, which is dimension B in FIG. 2, is adjusted to optimize the cosine distribution curve which is taken in reference to point C at the apex of the domed lens member 12. The overall effect is that the light reradiated from the lens member 12 to the photovoltaic sensor is an accurate representation of the amount of light radiated to a point C from all sources within a field.

Although the foregoing description covers a preferred embodiment of the present invention, it will be apparent to those skilled in the art that many changes and modifications may be made without departing from the subject matter thereof. For example, a selenium photo-voltaic cell could be used with appropriate dimensional changes or lens material change to effect cosine correction as previously described. Therefore, the scope of the present invention should only be determined by the following claims.

We claim:

1. A light probe including a photovoltaic sensor for a photometer, comprising:

a housing member having a cylindrical bore therein;
   a probe body member containing said sensor adjustably mounted in said housing member;
   lens means having an arcuate configuration mounted on said probe body member for receiving photons and radiating said photons to said sensor; and
   eyebrow means extending along said housing member outside said cylindrical bore to provide controlled shading of said lens means,
   said probe body member being adjusted with respect to said housing member so that said lens means is recessed into said cylindrical bore with only the apex thereof protruding above said eyebrow means, said eyebrow means shading said lens means an increasing amount for angles which are approximately 60° to 85° from normal to the optical axis thereof and preventing photons from impinging on said lens means at substantially 90° from normal, thereby correcting the cosine distribution curve of said sensor.

2. The light probe according to claim 1 wherein said lens means is constructed of a diffusing material to diffuse said photons therein.

3. The light probe according to claim 1 wherein said lens means is a converging lens having a double-convex configuration.

4. The light probe according to claim 1 wherein said lens means has a frosted outer surface thereon to reduce reflection of light.

5. The light probe according to claim 1 wherein said lens means has a spherical shape and is disposed adjacent said sensor, the optical axis of said lens means coincident with the optical axis of said sensor; and said eyebrow means comprises an annular shield member disposed around the periphery of said cylindrical bore in said housing member on a plane transverse to said optical axis.

* * * * *